No. 750,098. PATENTED JAN. 19, 1904.
B. J. DELZEIT.
MOTOR.
APPLICATION FILED OCT. 31, 1903.
NO MODEL.
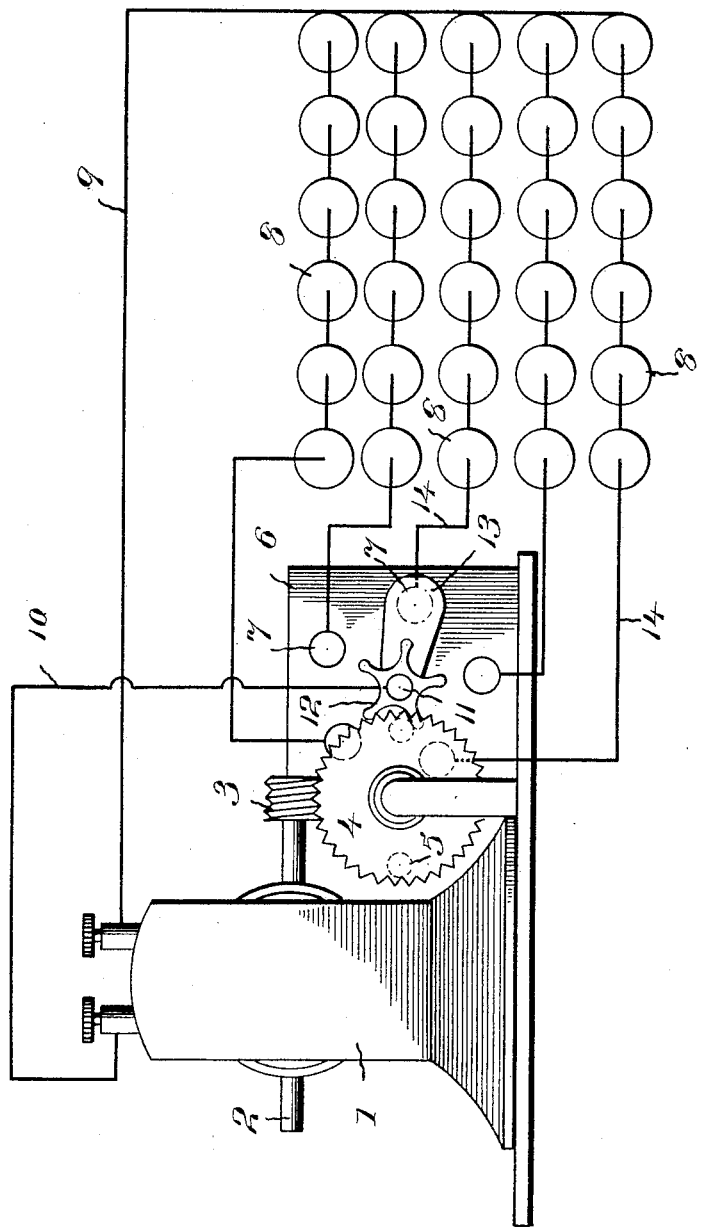
Witnesses
F. W. Riley.
Hubert D. Lawson.
Inventor
Bertram J. Delzeit.
By Victor J. Evans
Attorney No. 750,098. Patented January 19, 1904.

UNITED STATES PATENT OFFICE.

BERTRAM J. DELZEIT, OF PHILADELPHIA, PENNSYLVANIA.

MOTOR.

SPECIFICATION forming part of Letters Patent No. 750,098, dated January 19, 1904.

Application filed October 31, 1903. Serial No. 179,369. (No model.)

*To all whom it may concern:*

Be it known that I, BERTRAM J. DELZEIT, a citizen of the United States, residing at Philadelphia, in the county of Philadelphia and State of Pennsylvania, have invented new and useful Improvements in Motors, of which the following is a specification.

My invention relates to new and useful improvements in motors; and its object is to provide a device of this character adapted to be driven by power generated in batteries, said batteries being arranged in independent series and adapted to be placed successively into circuit with the motor, thereby permitting each series of batteries to rest for a predetermined period without retarding the operation of the motor.

With the above and other objects in view the invention consists in providing two or more series of batteries, each series being connected to one brush of the motor, while the other brush is connected to an arm adapted to be slowly rotated by the motor. This arm during its rotation is brought into contact with plates arranged in the path thereof and each of which is connected to one of the series of batteries.

The invention also consists in the novel construction and arrangement of the several parts, which will be more fully hereinafter described and claimed, and illustrated in the accompanying drawing, which is a diagrammatic view of a motor having batteries connected thereto in accordance with my invention.

Referring to the figure by numerals of reference, 1 is a motor, the shaft 2 of which is provided with a worm 3, which serves to slowly rotate a toothed disk 4, having preferably two lugs 5 extending from one face thereof. Arranged adjacent the disk 4 is an upright 6, upon which are located plates 7, which are equal in number to the number of series of batteries 8 used in connection with the motor. These series of batteries are adapted to be arranged at any suitable point, and each series is connected by means of a wire 9 with one brush of the motor, while the other brush is connected by a wire 10 with a stem 11, which is revolubly mounted within the upright 6. Secured to this stem is a star-wheel 12, which is adapted to be engaged and rotated by the lugs 5. A contact-plate 13 is also secured to the stem 11 and rotates therewith, and this plate is of such length as to contact with all of the plates 7 during one rotation thereof. Each plate 7 is electrically connected to its series of apertures 8 by means of a wire 14.

When the parts are in the positions illustrated in the drawing, the current generated will pass from the center series of batteries 8 through its wire 14 to plate 7, to which said wire is connected, and from this plate through the arm 13 and stem 11 to wire 10, and thence through the motor and back to the batteries by way of the wire 9. This current will, as is obvious, cause the motor to operate, and the shaft 2 will be rotated and cause the worm 3 thereon to slowly revolve the disk 4. As this disk revolves one of the lugs 5 will be brought into contact with the star-wheel 12 and partly turn it, thereby swinging the arm 13 into position upon the adjoining plate 7, when the circuit through the first-mentioned series of batteries will be broken and a new circuit established through another series. This operation will be continued, and the batteries will be successively thrown into circuit with the motor, and therefore each series of batteries will be idle for a predetermined period.

In the foregoing description I have shown the preferred form of my invention; but I do not limit myself thereto, as I am aware that modifications may be made therein without departing from the spirit or sacrificing any of the advantages thereof, and I therefore reserve the right to make all such changes as fairly fall within the scope of my invention.

Having thus fully described the invention, what is claimed as new is—

1. The combination with a motor, of independent series of batteries electrically connected to one brush thereof, and means operated by the motor for electrically connecting the series to the other brush of the motor successively.

2. The combination with a motor, of independent series of batteries electrically connected to one brush thereof, contact-plates electrically connected to the series of batteries, and means operated by the motor for successively electrically connecting said plates to the other brush thereof.

3. The combination with a motor, of independent series of batteries electrically connected with one brush thereof, contacts electrically connected to the series of batteries, a disk adapted to be rotated by the motor, and means operated by the disk for establishing an electrical connection between the contacts successively and the other brush of the motor.

4. The combination with a motor, a rotary disk, and means for imparting rotation to the disk from the motor, of a rotary contact operated by the disk, contact-plates in the path thereof and adapted to be successively contacted thereby, independent series of batteries electrically connected to their respective contact-plates and to one brush of the motor, and an electrical connection between the rotary contact and the other brush.

5. The combination with a motor having a revoluble worm, a toothed disk engaged by the worm, and a lug upon the disk, of a revoluble stem electrically connected to one brush of the motor, a wheel secured thereto and adapted to be contacted by the lug, a contact extending from the stem, contact-plates in the path thereof and adapted to be successively contacted thereby, and independent series of batteries electrically connected to their respective contact-plates and to the other brush of the motor.

In testimony whereof I affix my signature in presence of two witnesses.

BERTRAM J. DELZEIT.

Witnesses:
JOHN J. MAGUIRE,
JAMES McCAREY.